Oct. 8, 1963 C. W. NEWELL 3,106,607

APPARATUS FOR RECORDING AND REPRODUCING IMAGES ON MAGNETIC TAPE

Filed Dec. 15, 1960 5 Sheets-Sheet 1

CHESTER W. NEWELL
INVENTOR.

BY Robert H. Clay
ATTORNEY

CHESTER W. NEWELL
INVENTOR.

BY Robert G. Clay
ATTORNEY

APPARATUS FOR RECORDING AND REPRODUCING IMAGES ON MAGNETIC TAPE

Filed Dec. 15, 1960

CHESTER W. NEWELL
INVENTOR.

BY Robert G. Clay
ATTORNEY

Oct. 8, 1963 C. W. NEWELL 3,106,607

APPARATUS FOR RECORDING AND REPRODUCING IMAGES ON MAGNETIC TAPE

Filed Dec. 15, 1960 5 Sheets-Sheet 4

CHESTER W. NEWELL
INVENTOR.

BY Robert G. Clay
ATTORNEY

CHESTER W. NEWELL
INVENTOR.
BY
Robert G. Clay
ATTORNEY

United States Patent Office 3,106,607

Patented Oct. 8, 1963

3,106,607
APPARATUS FOR RECORDING AND REPRODUCING IMAGES ON MAGNETIC TAPE

Chester W. Newell, Sunnyvale, Calif., assignor to Ampex Corporation, Redwood City, Calif., a corporation of California Filed Dec. 15, 1960, Ser. No. 76,059
8 Claims. (Cl. 178—6.6)

The present invention relates to magnetic tape recorders and reproducers and, in particular, to a method and apparatus for recording and reproducing images on magnetic tape.

The presently used method of recording and reproducing images on magnetic tape requires many steps and complex equipment. In general, for recording, an image is converted by a suitable orthicon camera into a video signal representative of the image. Transducer units (magnetic heads) then translate the video signal into magnetic patterns which are stored on magnetic tape. Because the video signal formed in response to an image must have a frequency range extending from zero cycles per second to over four megacycles per second, both the electronic circuitry and the transducer units are complex and relatively expensive.

In particular, the magnetic head to tape velocity has to be exceedingly high. While this may be accomplished by any one of several known methods, at best the process is relatively complex and requires extreme accuracy. For example, the speed at which the tape is drawn across the magnetic head may be increased over that required for recording information having a lesser frequency band width by a rotary head arrangement of the type described in U.S. Patent No. 2,866,012.

For reproducing an image stored on magnetic tape in the foregoing manner, substantially the same equipment and procedures are utilized. Thus, the reproduction of magnetically stored images or information with the presently used systems is subject to the same disadvantages enumerated above.

It is therefore an object of the present invention to provide a new and improved method and apparatus for recording and reproducing an image on magnetic tape.

Another object of the invention is to provide a simplified method and apparatus for recording and reproducing images on magnetic tape.

A further object of the invention is to provide a method and apparatus for recording and reproducing images or information on magnetic tape using a substantially direct transformation between a view of the image and magnetic storage thereof and between the stored image and the reproduction thereof as a visual image.

A still further object of the invention is to provide a method and apparatus for recording and reproducing an image on magnetic tape wherein the image is converted to a magnetically stored image or a visual image by simple elements having a novel interaction.

One particular form of a recording apparatus according to the present invention, given by way of example, includes a transparent drum, formed by two coaxial cylinders with the intermediate space evacuated and containing magnetic particles having a photoemissive coating. An image to be recorded is suitably focussed on the outer cylinder, and under the influence of a combination of electric and magnetic fields, the particles are oriented in accordance with the distribution of light presented by the image. A pre-polarized magnetic tape is then passed adjacent to the oriented particles and an erasing magnetic field is applied. The combination of the oriented particles and the erasing field results in selective erasure of the pre-polarization of the magnetic tape to form a stored image on the tape.

To reproduce the image of the tape a similar arrangement of two cylinders is provided, but the intermediate space is provided with magnetic particles in a colloidal suspension. In this instance the particles are pre-aligned by a magnetic field. By the use of high frequency magnetic fields, the stored image on the tape is used to orient the particles so as to reproduce the image. Then, by projecting light through the two cylinders from the center outward, a projected image is attained.

In both the recording and reproducing arrangements, as set forth in the foregoing, it is to be noted that between the optical image and the magnetically stored image there exists a light shutter or valve. These are embodied in the plurality of magnetic and light sensitive particles used in the recording apparatus and in the plurality of magnetic particles used in the reproducing apparatus. Thus, any structural arrangement, including the coaxial drums referred to above, is suitable where the image formed by the particles is transported between an optical system for focusing an image and a magnetic tape for storage of the image and separately between the stored image of the tape and an optical projection system. Such a method and apparatus then becomes analogous to the optics-to-chemical reaction-to-optics transfer of photographic film but has material advantages because of the selective erasability which is achieved.

Other objects and advantages will be readily apparent from the following description and claims when considered together with the accompanying drawings, in which:

Figure 1:
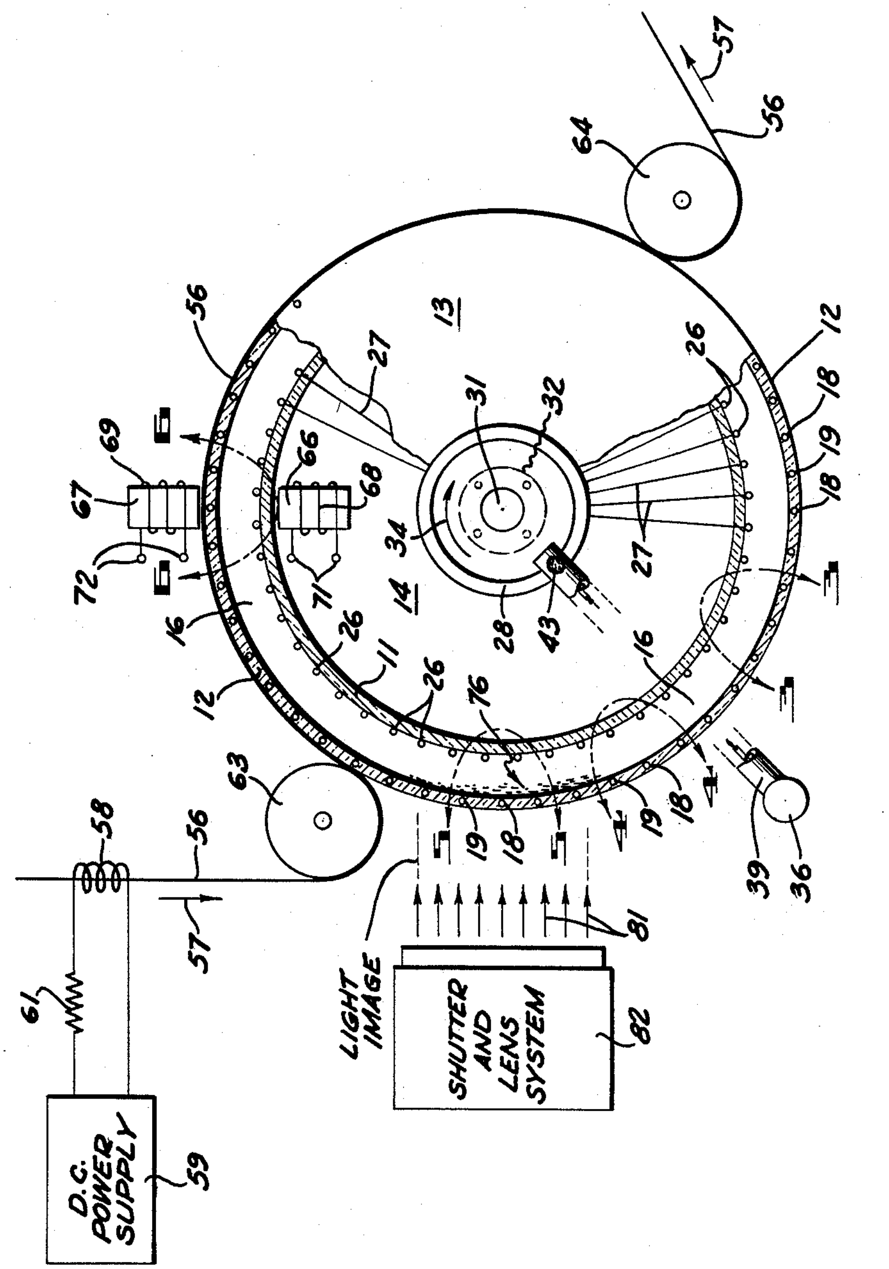
FIGURE 1 is a plan view, partly in section, of a recording apparatus in accordance with the present invention.

Referring, now, to the drawings in detail, FIGURE 1 in particular, there is shown a plan view, partly in section, of one form of a recording apparatus according to the present invention. Two hollow cylinders 11 and 12 of a transparent and electrically insulating material are coaxially mounted with the ends thereof suitably closed by plates 13 and 14, respectively, to provide a hollow cylindrical chamber 16 between the cylinders.

Figure 2:
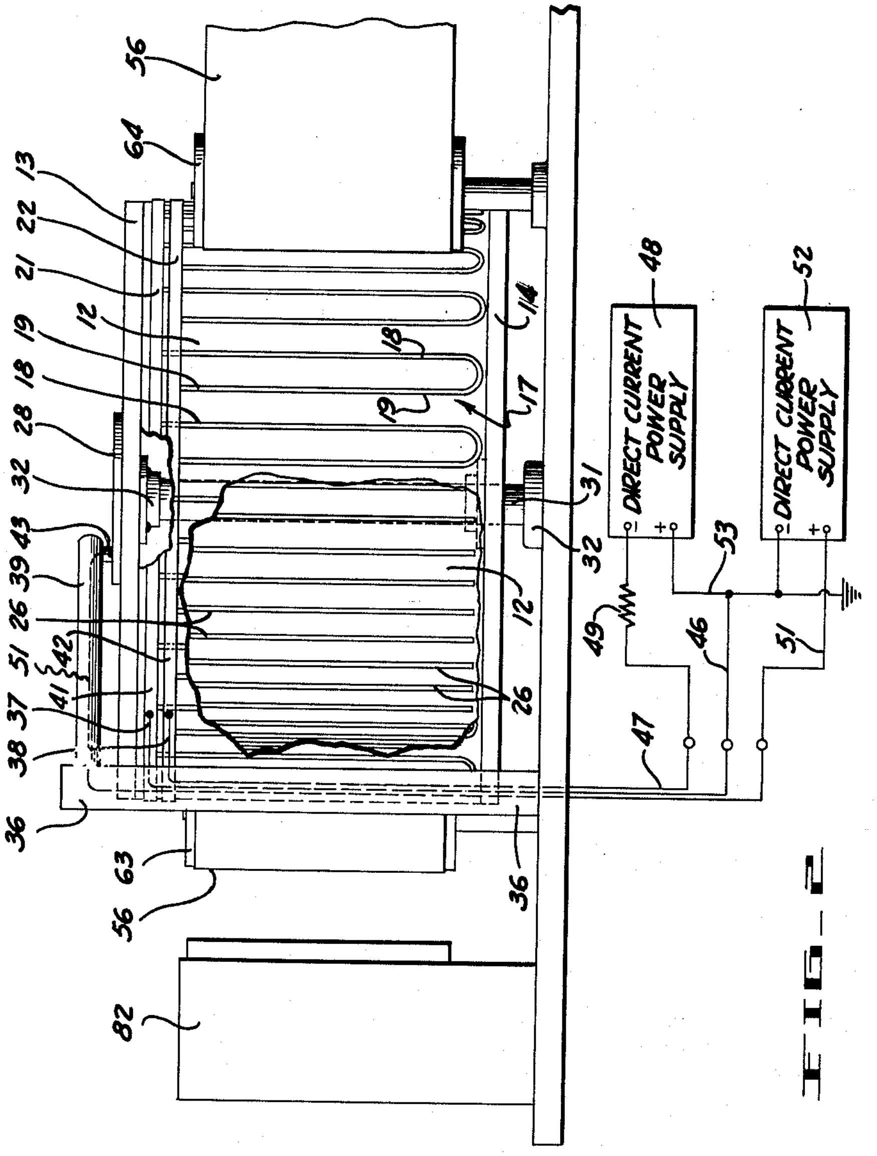
FIGURE 2 is a side elevation of the apparatus of FIGURE 1.

As best seen in the side elevation of FIGURE 2, a plurality of U-shaped conductors 17 are transversely embedded in parallel relation across the cylindrical surface of the outer cylinder 12. By transverse is meant that the conductors 17 principally lie parallel to the central axis of the cylinder 16. The spacing between the separate legs 18 and 19 of each conductor 17 is arranged substantially equal to the spacing between the adjacent conductors. To include the conductors 17 in parallel circuit couplings, a first commutator ring 21 is mounted circumferentially about the outer cylinder 12 at one end thereof with a connection being made to one of the legs 18 of each conductor and a second, similarly mounted, commutator ring 22 is provided with a connection being made to each of the other conductor legs 19. The conductors 17 preferably have magnetic as well as conductive properties, for reasons set forth in greater detail below.

Referring again to FIGURE 1, a plurality of parallel wires or conductors 26 are transversely mounted on the outer surface of the inner cylinder 11 within the chamber 16. Also, such wires 26 are mounted parallel to the conductors 17 of the outer cylinder 12 and are disposed on a radius that includes the midpoint between each successive leg 18 and 19 of the conductors 17. The reason for such relationship between the respective conductors 17 and 26 of the two cylinders 11 and 12 is set forth and discussed below. An electrical charge is applied to the wires 26 by way of a plurality of leads 27, only a few of which are shown, extended radially inwardly from one end of each wire 26 to a third ring commutator 28, disposed and centered on one end plate 13, with the other end of the wires 26 remaining open-circuited.

In accordance with the illustrated form of the invention, a shaft 31 is extended axially through the coaxial cylinders 11 and 12 with the end plates 13 and 14 suitably affixed to the shaft as by respective mounting plates 32 and 33. For rotation of the shaft 31 and the coaxial cylinders 11 and 12 in the direction of the arrow 34 of FIGURE 1, one end of the shaft may be suitably journaled in a conventional manner and coupled to a drive motor (not shown).

Now, as shown in FIGURE 2, and omitted from FIGURE 1 for ease of illustration of other details, a support rod 36 is mounted in fixed relation with and parallel to the shaft 31 for supporting three extended arms 37, 38, and 39, respectively. One arm 37 is extended to hold an electrical brush 41 in contact with the commutator ring 21, another arm 38 is extended to hold a second electrical brush 42 in contact with the commutator ring 22, and the third arm 39 is extended to hold a third electrical brush 43 in contact with the remaining commutator ring 28.

The brushes 41 and 42, which respectively contact the two commutator rings 21 and 22, are connected by leads 46 and 47 to terminals of a first direct current power supply 48 through a current limiting resistor 49. A lead 51 is connected from the brush 43, which contacts the commutator rings 28, to the positive termial of a second direct current power supply 52. Also, a lead 53 is extended from the negative terminal of the second power supply 52 to one of the terminals of the first power supply 48 and this connection may be grounded to provide a voltage reference. These connections, which are illustrated schematically in FIGURE 2, apply an electric charge to the wires 26 that is positive with respect to the conductors 17 and provide a flow of current through the conductors 17.

Magnetic tape 56, as unwound from a supply reel (not shown) in the direction of arrows 57, is trained axially through a pre-polarizing coil 58 that is connected between the terminals of a direct current power supply 59 through a current limiting resistor 61. By the term pre-polarization is meant that the magnetic particles of the tape 56 are aligned in the same direction. From the coil 58 the tape 56 engages a first idler roller 63 that lays the tape along the outer cylindrical surface of the outer cylinder 12. A second idler roller 64 positioned substantially opposite the first roller 63 across the cylinders 11 and 12 then trains the tape 56 away from the outer cylinder 12 to a take up reel (not shown). The path of the magnetic tape 56, as described in the foregoing, has been shown in FIGURE 1 and omitted from FIGURE 2 for ease of illustration. The tape drive and supply mechanisms have been simplified or have not been shown, inasmuch as known systems may be employed in order to simplify the description.

Along a portion of the path of the magnetic tape 56, which is in contact with the cylinder 12, two ferromagnetic pole pieces 66 and 67 are suitably mounted in fixed and aligned relation along a radius of the two cylinders 11 and 12. One of the pole pieces 66 is mounted internally of the inner cylinder 11 with a surface closely adjacent thereto and the other pole piece 67 is mounted externally of the outer cylinder 12 with a surface closely adjacent to the magnetic tape 56 in contact with the cylinder 12. Thus, the gap between the opposed facing surfaces of the respective pole pieces 66 and 67, is minimized and spans the chamber 16 as well as the magnetic tape 56. The facing surfaces of the pole pieces 66 and 67 may be convex and concave to match the curvatures of the two cylinders 11 and 12. Windings 68 and 69 are respectively provided on the pole pieces 66 and 67 and are suitably connected in a conventional circuit arrangement with a source (not shown) of radio frequency energy to provide an erasing magnetic field across the chamber 16 and through the magnetic tape 56. Leads of the windings 68 and 69 are shown in FIGURE 1 as terminating at terminals 71 and 72, respectively, and connection may be made to the inner terminals 71 by an arrangement of commutator rings (not shown) similar to the previously described commutator ring 28.

In accordance with the invention, the chamber 16 is maintained under vacuum or reduced pressure and magnetic particles 76 are distributed therethrough. Preferably, the magnetic particles 76 are acicular in form with a diameter to length ratio between 10 to 1 and 20 to 1 and may be similar in magnetic properties to the ferric oxide particles now used on magnetic tapes. Also, the size of the individual particles 76 is finite, but less than the bit size of the information to be recorded. The particle size is in effect selected with respect to the resolution desired, with two or three particles being employed for each information bit. In addition to the foregoing properties of the particles 76, a coating 78 of photoemissive material, such as cesium oxide, is applied to the particles prior to insertion into the chamber 16.

To illuminate a portion of the outer cylinder 12 with an image, indicated by parallel arrows 81, there is provided a conventional shutter and lens optical system, generally shown as a block 82. Thus, the light patterns of the image 81 are projected on the outer cylinder 12 in a region preceding the portion of the cylinder contacted by the magnetic tape 56 as the cylinder rotates.

Figure 3:
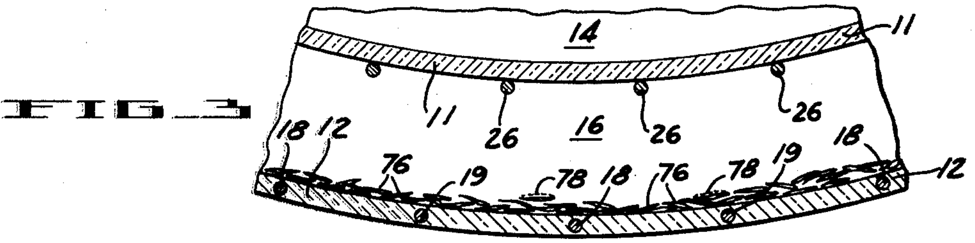
FIGURE 3 is an enlarged fragmentary view of the segment encompassed by the line 3—3 of FIGURE 1.

Consider now the recording apparatus described in the foregoing, as the coaxial cylinders 11 and 12 are rotated in the direction of the arrow 34 by means of the driven shaft 31. The rotation results in centrifugal forces which cause the magnetic particles 76 to migrate to and remain against the inner surface of the outer cylinder 12 and, prior to energization of the source 48, to have a random distribution substantially parallel to the surface, as illustrated in FIGURE 3.

When the source 48 is energized, a series circuit continuously exists from one terminal thereof through the current limiting resistor 49, the brush 38, the ring commutator 22, each of the conductors 17, the ring commutator 21, and the brush 37 to the other terminal of the source (see FIGURE 2). Current then flows through such series circuit and, in doing so, passes in opposite directions along the respective legs 18 and 19 of the conductors 17. Thus, the respective magnetic fields formed about the conductor legs 18 and 19, due to the current flow, have opposite directions as indicated by arrows on the field patterns 101 and 102 of FIGURE 4. Because they are in opposite directions, the magnetic fields are additive and form concentrated magnetic field regions between the successive conductor legs 18 and 19. The acicular or needle-shaped magnetic particles 76, magnified and reduced in quantity in FIGURE 4 for simplicity of illustration, are attracted to the concentrated magnetic field regions. Further, the particles 76 are aligned parallel to the magnetic field lines and perpendicular to the surface of the cylinder 12. It is to be noted that, at this point, the particles 76 are electrically neutral and react only in accordance with their magnetic properties.

Figure 4:
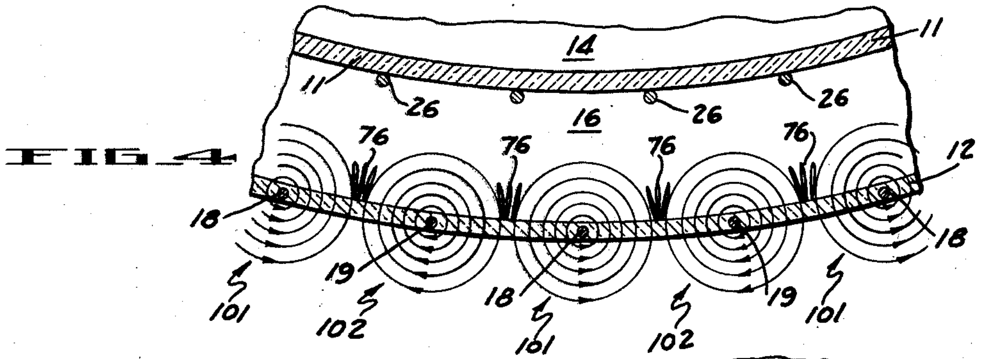
FIGURE 4 is an enlarged fragmentary view of the segment encompassed by the line 4—4 of FIGURE 1.

As the cylinders 11 and 12 are revolved so that the fragment illustrated in FIGURE 4 is subjected to the light pattern of the image 81, electrostatic forces resulting from the potential impressed by the source 52 becomes effective. Thus, light waves impinging on the particles 76 cause emission of electrons from the photoemissive coating 78 of the particles, thereby leaving the particles 76 with net positive electrical charges. With the source 52 energized, the wires 26 are positively charged with respect to the conductors 17. This positive relative charge also results in an electrical force of repulsion upon the now positively charged particles 76. The magnitude of the force of repulsion with respect to a particular particle 76, is then a function of the strength or intensity of the light impinging on that particular particle 76.

Figure 5:
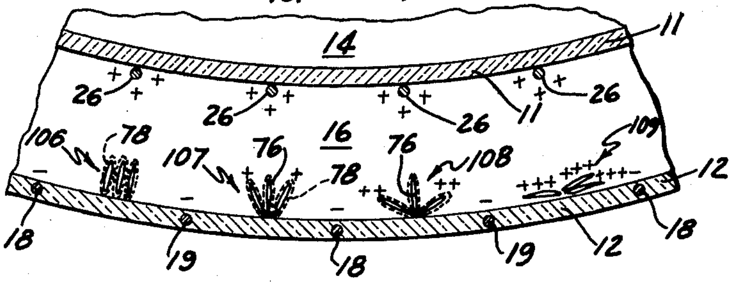
FIGURE 5 is an enlarged fragmentary view of the segment encompassed by the line 5—5 of FIGURE 1.

With more intense light, more electrons are emitted and a greater net positive charge exists, so that a greater force of repulsion is applied. The resultant alignment of the particles 76 is thus related to the combination of the magnetic forces acting on the magnetic particles 76 due to the flow of current through the conductor legs 18 and 19 and the electrical forces between the charge of the wires 26 and the charge of the particles due to electron emission. By way of illustration four different groups 106 to 109 of particles 76 are shown in FIGURE 5 in varying stages of alignment according to the intensity of illumination incident thereon. Thus, the group 106 shows the particles 76 in perpendicular alignment with respect to the surface of the cylinder 12 and indicates the condition of minimum light intensity. At the other extreme of maximum light intensity the particles 76 become aligned substantially parallel to the surface of the cylinder 12 indicating that the electrical forces of repulsion are greater than the magnetic forces. The other two groups 107 and 108 show the resultant angular position of the particles 76 when subjected to intermediate intensities of light from the image 81.

Continual rotation of the coaxial cylinders 11 and 12 then conveys the exposed portion, where the image 81 has caused orientation of the particles 76 in accordance with the light pattern to a position between the pole pieces 66 and 67. Because the position of exposure is on the order of a quarter of the circumference of the outer cylinder 12 from the pole pieces 66 and 67, the particles 76 remain charged and oriented in the described manner for a sufficient interval for the subsequent transfer to magnetic tape.

Figure 6:
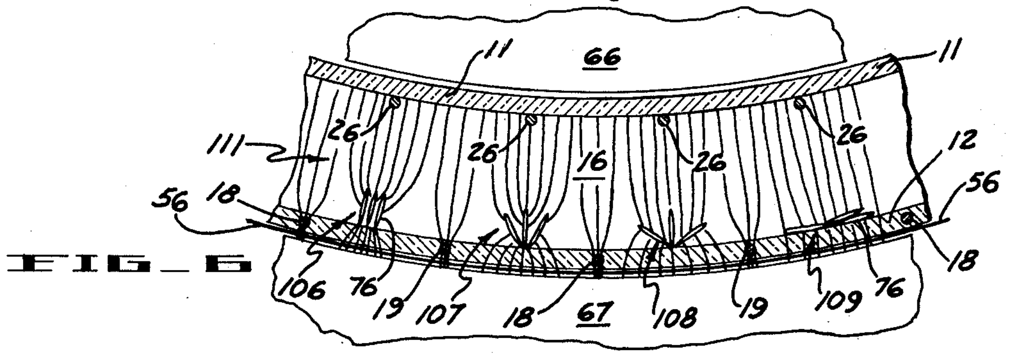
FIGURE 6 is an enlarged fragmentary view of the segment encompassed by the line 6—6 of FIGURE 1.

Now, in accordance with the invention, the magnetic tape 56 is pre-polarized so as to align the magnetic particles of the tape in the same direction. This pre-polarization is accomplished by the magnetic field of the solenoid 58 through which the tape is axially moved. After the magnetic tape 56 is pre-polarized the tape is fed onto and about the rotating outer cylinder 12 so as to pass between the pole pieces 66 and 67. The coils 68 and 69 of the pole pieces 66 and 67 are suitably excited by the source of radio frequency energy (not shown) to which they are coupled, so that they establish an erasing magnetic field 111 through the chamber 16 and the pre-polarized magnetic tape 56, as shown in FIGURE 6.

The effect of the erasing field 111 between the pole pieces 66 and 67 on the pre-polarized magnetic tape 56 is, for any minute localized area on the tape 56, a function of the orientation of the particles 76 in the chamber 16. Such effect is illustrated in FIGURE 6, in which the orientations of the particles as shown in FIGURE 5 are reproduced, but in which the magnetic field patterns 101 and 102 are omitted for convenience of illustration. The erasing field 111 follows paths of low reluctance and, therefore, tends to follow paths lying along the lengths of the magnetic particles 76. When the particles 76 are perpendicular to the surface of the cylinder 12, the erasing field 111 is distorted and concentrated in the particles and in the conductors 17 so that the field is confined to substantially small areas in traversing the magnetic tape 56. Conversely, when the particles 76 are substantially parallel to the surface of the cylinder 12, there are no particular low reluctance paths so the magnetic field is substantially undistorted and therefore uniform. Thus, erasure of the pre-polarization of the magnetic tape is less complete, as to minute localized areas, where the particles 76 form a perpendicular group 106 than for a parallel group 109. Graduated intermediate erasures occur in the minute areas for the angularly disposed groups 107 and 108 which are variously oblique to the surface of the cylinder 12. The result is the formation of a stored magnetic image on the tape 56 which is comparable in distribution to the areal image of a photograph.

By correlating the action of the shutter, in the shutter and lens optical system 82, to the peripheral speed of the outer cylinder 12, the information of the image 81 is consecutively stored on the magnetic tape 56 in separate frames. Single frames, or a continuous picture provided by scanning a moving field with a slit aperture, may also be provided. The magnetic tape 56, as wound upon the take up reel (not shown), then has a stored magnetic image history similar to a chemically recorded photographic motion picture film.

During the remainder of one revolution of the coaxial cylinders 11 and 12 from the position of the erasing field between the pole pieces 66 and 67 to the position of image illumination, the particles 76 lose the positive electrical charge by a recombination process between the particles and stray electrons. Such recombination process to electrically neutralize the coating 78 of the particles 76, so that only the magnetic properties of the particles are again solely dominant, may be speeded by any conventional arrangement whereby free electrons are introduced into the chamber 16 in the vicinity of the charged particles 76. Thus, by the time of one revolution of the cylinders 11 and 12, the particles 76 are again aligned perpendicular to the surface of the outer cylinder 12 and are in condition to receive another illuminated frame of the image 81.

Figure 7:
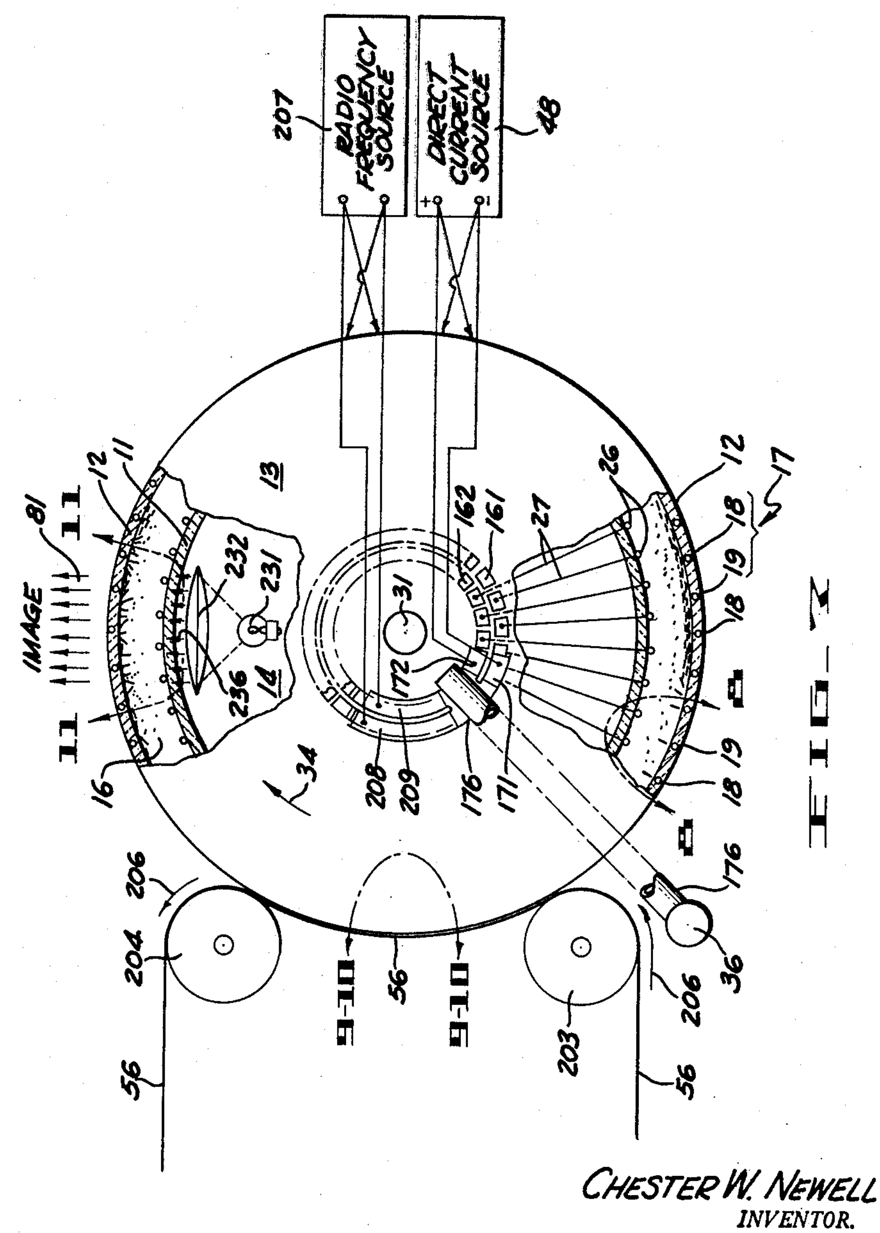
FIGURE 7 is a plan view, partly in section, of a reproducing apparatus in accordance with the present invention to be used in conjunction with the apparatus of FIGURE 1.

To reproduce the image recorded on the magnetic tape 56, in accordance with the foregoing, a related but modified arrangement is provided to translate the magnetic image into an optical image. Reference may now be made to FIGURE 7 of the drawing in which like reference numerals are used to indicate elements the same as those of the preceeding figures. In FIGURE 7 there is shown two coaxially disposed transparent inner and outer cylinders 11 and 12, respectively, having end plates 13 and 14 forming a hollow cylindrical chamber 16 between the cylinders. Conductors 17 of U-shape are embedded in the outer cylinder 12 and the respective legs 18 and 19 thereof are alternately connected to commutator rings (not shown) mounted similarly to the commutator rings of FIGURE 2. Wires 26 are mounted on the outer surface of the inner cylinder 11 with leads 27 extended radially inwardly toward the central axis of the cylinder at both of the end plates 13 and 14 (only one such arrangement being shown).

Also, in a manner similar to the recording apparatus of FIGURES 1 and 2, shaft 31 is axially extended through the cylinders 11 and 12 and attached to the end plates 13 and 14. A motor (not shown) coupled to the shaft 31 provides rotation of the two cylinders 11 and 12 in the direction of the arrow 34. Thus, the arrangement of the cylinders 11 and 12 as described thus far is substantially the same for both recording and reproducing.

The chamber 16 is, as before, maintained evacuated and includes a distribution of acicular magnetic particles 76; however, in this instance, the photoemissive coating 78 is not required and is therefore omitted. Additionally, since electrical forces on the particles 76 are not utilized during image reproduction, the particles are suspended in a suitable colloid 141, such as a fine silicone oil.

Figure 8:
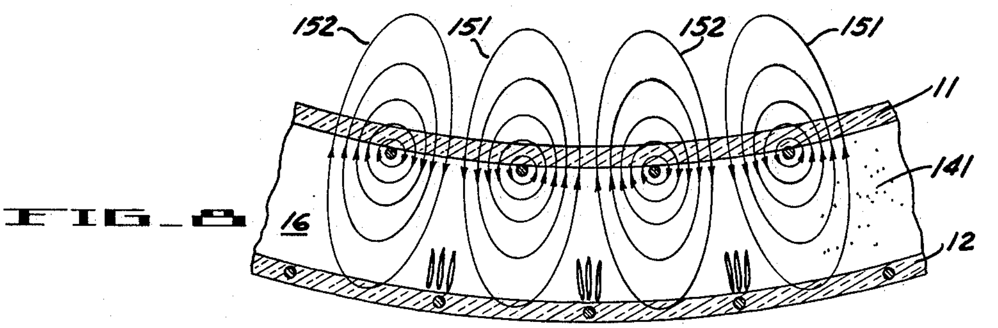
FIGURE 8 is an enlarged fragmentary view of the segment encompassed by the line 8—8 of FIGURE 7.

In general, for reproduction of the magnetic image of the tape 56, the particles 76 are pre-aligned in a manner similar to that set forth for recording the image 81. For reproduction, however, the pre-alignment is accomplished by field patterns 151 and 152 about the wires 26 of the inner cylinder 11, as shown in FIGURE 8. To provide the fields 151 and 152, two coaxial and segmented commutator rings 161 and 162 (FIGURE 7) of different diameters are centrally mounted on each of the end plates 13 and 14. The leads 27 are successively and alternately connected to successive segments of the respective commutator rings 161 and 162. By suitably connecting the direct current source 48 between commutator rings 161 at either end plate 13, 14 with one polarity and between commutator rings 162 at the other end plate with reversed polarity, current flows in opposite directions along adjacent ones of the wires 26. Such pre-alignment of the particles 76 is accomplished over a substantially short distance by circuits completed through brushes 171 and 172, which contact several segments of each of the commutator rings 161 and 162, and which are mounted on an arm 176 extended from the post 36 at the end plate 13 or 14 which includes the rings 161 and 162. Thus, the magnetic field patterns 151 and 152 result in alignment of the particles 76 perpendicular to the surface of the outer cylinder 12 at the concentrated field regions between the wires 26. Because of the colloidal suspension of the particles 76, the particles remain in the prealigned position without the influence of the fields 151 and 152, as the cylinders 11 and 12 are rotated.

After pre-alignment of the particles 76 in the foregoing manner, the cylinders 11 and 12 continue to rotate to a position where the image bearing tape 56 contacts the outer cylinder 12. Thus, the tape 56 is fed from a storage reel, which was the take up reel during recording, about a first idler roller 203 along the outer cylinder 12 and from a second idler roller 204 to a take up reel in the direction of the arrow 206.

In accordance with the present invention, a radio frequency source 207 is applied to the wires 26 within an arcuate segment formed by lines extended from the axis of the cylinders 11 and 12 to the respective centers of the two rollers 203 and 204. Thus, enlarged brushes 208 and 209 are connected at each end plate 13 and 14, respectively, to terminals of the source 207. Such brushes 208 and 209 are mounted on the arm 176 to contact a number of segments of the commutator rings 161 and 162 within the arcuate segment so that alternating current flows through successive wires 26 in the opposite direction. The frequency of the radio frequency source 207 is selected to be of a sufficiently high value to avoid demagnetization of the tape 56 and to avoid disturbance of the alignment of the particles 76. It is well known that radio frequency magnetic fields may be used to erase stored magnetic fields up to a certain value of frequency and that, as the frequency increases further, the erasing effect disappears because of the changed configuration of the hysteresis loop of the magnetic material; that is, the loop closes and shortens to become substantially a confined straight line at the higher radio frequency magnetic fields. The result is that the magnetization of the magnetic material is not appreciably changed.

Figure 9:
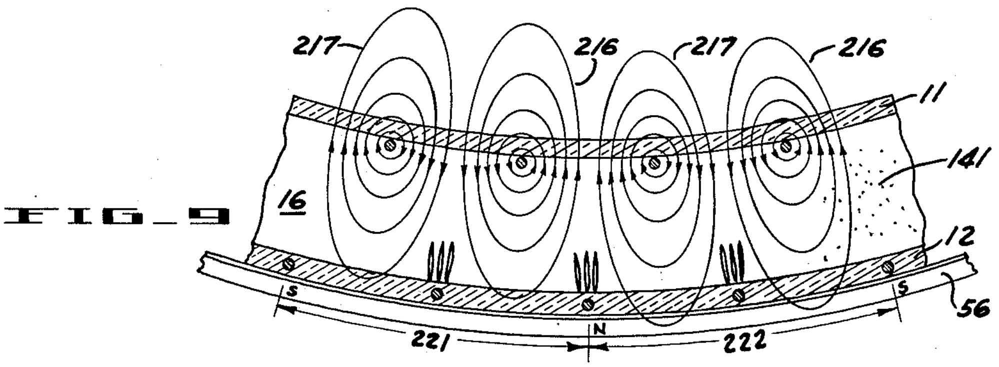
FIGURE 9 is an enlarged fragmentary view of the segment encompassed by the line 9—9 of FIGURE 7.

The radio frequency current flowing through the wires 26 provides circular magnetic field patterns 216 and 217 about the wires in the manner shown in FIGURE 9. Because the current is alternating at a high frequency, the direction of the magnetic field lines of the patterns 216 and 217 reverses during successive half cycles and the patterns of FIGURE 9 are illustrative of only one half cycle. Consider, now, the effect of the magnetic tape 56 as the tape contacts the outer cylinder 12 and bears a magnetic history such that the left-hand portion 221 of FIGURE 9 has a minimum stored field and the right-hand portion 222 has a maximum stored field, as generally indicated by pole markings N and S on the tape. It should be recalled that during recording of the image 81, maximum erasure of the pre-polarized tape 56 occurred in response to maximum illumination by the image 81 and, conversely, minimum erasure occurred in response to minimum illumination.

For the half cycle of the radio frequency current shown in FIGURE 9, the portion 221 of the tape 56 has no effect on the field patterns 216 and 217 and the particles 76 remain in the pre-aligned position perpendicular to the surface of the outer cylinder 12. Along the portion 222 of the tape 56, the direction of the field lines of the patterns 216 is such as to be opposing with respect to the field lines (not shown) of the magnetic history of the tape maximum in this instance. The net direct current component of the combination of the radio frequency fields and the stored field of the tape 56 is perpendicular to the surface of the outer cylinder 12. For a condition of minimum magnetic history on the tape 56, indicating maximum illumination by the image 81 during recording, the particles 76 remain in the pre-aligned position.

Figures 10, 11:
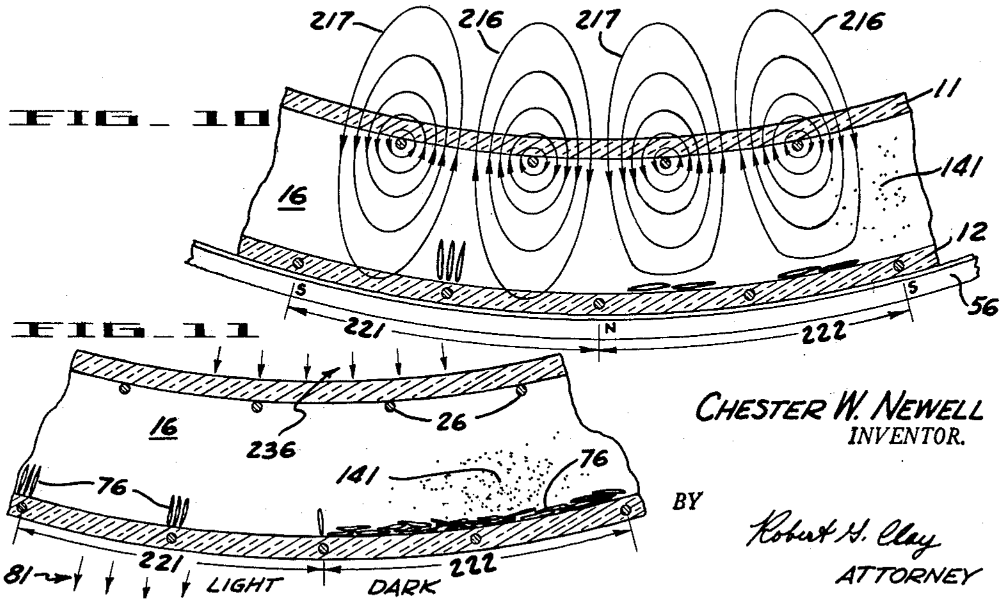
FIGURE 10 is an enlarged fragmentary view of the segment encompassed by the line 10—10 of FIGURE 7.
FIGURE 11 is an enlarged view taken along the line 11—11 of FIGURE 7.

The effect of the next succeeding half cycle of the radio frequency current flowing along the wires 26 is illustrated in FIGURE 10 with the same conditions of magnetic history of the tape 56 existing as set forth with respect to FIGURE 9. During such succeeding half cycle the direction of the field lines of the patterns 216 and 217 has reversed, but for the tape portion 221 there has been no change in magnetic effects to alter the pre-aligned position of the particles 76. With respect to the tape portion 222, however, the reversal of the field lines causes the lines to be additive to the direction of the field due to the magnetic history of the tape 56. A net direct current magnetic field component is then established parallel to the surface of the outer cylinder 12 along which the particles 76 become aligned. For a condition of maximum magnetic history on the tape 56, indicating minimum illumination by the image 81 during recording, the particles 76 are influenced to assume a position parallel to the surface of the outer cylinder 12.

Where the magnetic history of the tape 56 falls between the minimum and maximum conditions, as described with respect to the illustrations of FIGURES 9 and 10, the particles assume intermediate oblique positions dependent upon the relative strength of the radio frequency magnetic field and the strength of the magnetic field of the stored magnetic history on the tape 56. During the time that the magnetic tape 56 contacts the outer cylinder 12, the stored magnetic image is translated to a corresponding image formed by the resultant alignment of the particles 76. The cylinders 11 and 12 continue to rotate to the position of image projection.

At the position of image projection, as illustrated in FIGURE 7, a conventional projection bulb 231 and lens system 232, the latter being generally indicated as a single lens, is suitably mounted within the inner cylinder 11 in stationary relation to project parallel light rays (arrows 236) through both transparent cylinders 11 and 12. As one example of the fixed mounting (not shown) of the bulb 231 and lens system 232, a bracket may be extended from a suitably anchored post (not shown) through a circular slot (not shown) in one of the end plates 13 and 14 with the slot positioned between the shaft 31 and the commutator rings 161 and 162. Electrical leads (not shown) may be readily trained along the bracket from a source of energizing potential to the bulb 231.

The parallel light rays 236 are then passed with maximum intensity through the areas of the cylinders 11 and 12 where a portion 221 of the tape 56 contacted the cylinders and where the particles 76 remain aligned perpendicular to the surface of the outer cylinder 12, as shown in FIGURE 11. Conversely, the light rays 236 are substantially blocked from passage outwardly in the areas of cylinders 11 and 12 where a portion 222 of the tape 56 contacted the cylinders and the particles 76 are aligned parallel to the surface of the outer cylinder 12. Intermediate intensities of light rays 236 are, therefore, passed through the cylinders 11 and 12 according to the angular alignment of the particles 76 with respect to the surface of the outer cylinder 12. This reproduction apparatus therefore provides an optical image the same as the originally projected image 81 during recording.

With respect to the foregoing it should be noted that, in those areas, such as resulting from the presence of perpendicularly aligned particles 76 and the conductors 17, which correspond to points of maximum erasure of the tape 56 during recording, extreme and concentrated erasure occurs in a small area during reproduction. The effect that might be expected from such erasure is overcome by the surrounding areas of higher magnetic field on the tape 56; that is, the effect is swamped-out during reproduction of the magnetic image. Also, after being aligned by the combination of magnetic fields discussed above, including the magnetic history of the tape 56, the particles 76 remain in the finally aligned position during rotation of the cylinders 11 and 12 because of the suspension colloid 201. Thus, the particles 76 retain their relative positions to define the magnetic image on the tape 56 during rotation of the cylinders 11 and 12 until again pre-aligned by the field patterns 151 and 152 of the wires 26, as shown in FIGURE 8.

To summarize the above operation, an optical image 81 is magnetically recorded in structures in accordance with the invention when the image is focussed by the projection lens system 82 on the outer cylinder 12 (FIGURE 1) while the cylinder is being rotated. Prior to the inner and outer cylinders 11 and 12 being rotated to the position of illumination by the image 81, the acicular magnetic particles 76 in the evacuated chamber 16 between the cylinders are magnetically pre-aligned perpendicular to the surface of the outer cylinder 12. This latter operation is effected by the flow of direct current in opposite directions along the adjacent parallel conductor legs 18 and 19 imbedded in the outer cylinder 12 so that the particles are aligned along the concentration of magnetic fields 101 and 102 (FIGURE 4) between the conductor legs.

In order for the particles 76 to react to the intensity of illumination from the image 81, the particles are provided with the photoemissive coating 78 and, therefore, become positively charged by the emission of electrons from the coating to an extent dependent upon the intensity of light on a particular particle. A source 52 of direct current potential impressed between the wires 26 and both conductor legs 18 and 19, with the wires being positive in relation to the conductor legs, then establishes an electrical field between the two cylinders 11 and 12. Thus, the magnetically pre-aligned and electrically charged particles 76 are repelled by the charge of the wires 26 to assume varying positions of alignment in accordance with the pattern of light intensity from the image 81.

The magnetic tape 56 is pre-polarized, to align the magnetic particles thereof in a given direction by direct current energization of the solenoid 58, and moved to contact a portion of the outer cylinder 12. The erasing magnetic field 111 (FIGURE 6) established between the pole pieces 66 and 67 then provides selective erasure of the pre-polarization of the tape 56 dependent upon the final alignment of the particles 76 in the chamber 16 as established by the light image 81. In those areas 221 where the particles 76 are subjected to a minimum intensity of illumination from the image 81, the particles remain perpendicular to the outer cylinder 12 so that the erasing field 111 is distorted and substantially confined to a path through the particles. For minute localized areas, then, there is provided minimum erasure of the magnetic pre-polarization of the tape 56.

Conversely, in those areas where the particles 76 are subjected to a maximum intensity of illumination from the image 81, the particles are aligned parallel to the outer cylinder 12 so that the erasing field 111 is not distorted and the minute areas of the tape 56 are subjected to maximum erasure of the magnetic pre-polarization. Those particles 76 receiving intermediate intensities of illumination, between the minimum and maximum intensities discussed, are aligned at varying oblique degrees of angularity with respect to the outer cylinder 12. Such latter angular alignment of the particles 76 results in varying degrees of magnetic erasure of the tape 56 depending upon the amount of angular variation from the perpendicular position with respect to the outer cylinder 12. When the effects of the alignments of all of the particles 76 are considered, there is seen to be a selective magnetic erasure of the tape 56 in accordance with the attitudes of the particles. Consequently there is a magnetic image recorded on the tape which corresponds to the optically projected image 81. The magnetic tape 56 with the magnetically stored image is then wound on a take up reel for future reproduction and the particles are reconditioned for further recording.

To optically reproduce the stored image, the take up reel of the recording process is installed as a storage reel and the magnetic tape 56 is unwound from it to contact the cylinders 11 and 12 of the reproducing apparatus (FIGURE 8). As with the recording apparatus, prior to contact between the magnetic tape 56 and the outer cylinder 12, the particles 76 in the chamber 16 are pre-aligned by concentrated direct current magnetic fields 151 and 152 between successive wires 26 to positions perpendicular to the outer cylinder. Here the acicular particles 76 are not provided with the photoemissive coating 78, but are suspended in the colloid 201 so that the particles retain aligned positions as the cylinders 11 and 12 are rotated.

With the particles 76 in the chamber 16 pre-aligned perpendicular to the outer cylinder 12, the tape 56 bearing the magnetic image is brought into contact with the outer cylinder. At this time the high frequency current of the source 207 flows in the same direction through the wires 26 to produce magnetic field patterns 216 thereabout. The frequency of the source 207 is sufficiently high to avoid erasure of the magnetic history of the tape 56 and to have no effect upon the alignment of the particles 76. Where there is no magnetic history on the tape 56, corresponding to maximum intensity of illumination during recording, the high frequency magnetic fields 216 have no effect upon the particles 76 during successive half cycles. Thus, the particles 76 remain in the pre-aligned position, perpendicular to the outer cylinder 12.

The result is different, however, where the magnetic tape 56 bears a magnetic history indicating lesser intensities of illumination during recording. Under these conditions the tape 56 has an associated magnetic field, indicated by the magnetic pole markings N and S of FIGURES 9 and 10, so that during one half cycle of the high frequency current the fields 216 and 217 are additive with respect to the magnetic fields of the tape and during the next half cycle the two fields are in opposition. For the half cycle that the two fields are in opposition, the combined fields are such that no concentrated areas of field exist and no physically effected forces are exerted on the particles 76 to cause changes of position. In the half cycle during which the two fields are additive, a net direct current component of the combined fields results which is parallel to the surface of the outer cylinder 12.

The strength of the net direct current field component is related to the strength of the magnetic field on the tape 56 and, therefore, to the intensity of illumination during recording. Thus, for those areas of the tape 56 corresponding to minimum or no illumination the field of the tape is maximum and the particles are forced to assume positions parallel to the outer cylinder 12. Similarly, the particles 76 are forced into varying oblique angular positions for intermediate values of magnetic fields on the tape 56. The particles 76 are, accordingly, aligned in correspondingly varying positions dependent upon the magnetic history of the tape 56, to act to block the passage of light in a manner suitable for optically projecting a reproduction of the image 81.

Upon further rotation of the cylinders 11 and 12 to the position of the internally mounted projection system, the light rays from the bulb 231 and lens system 232 are projected through the two transparent cylinders. Maximum light penetrates the areas where the particles 76 are perpendicular to the outer cylinder 12 and minimum light penetrates areas where the particles are parallel to the outer cylinder with intermediate intensities of light passing the angularly disposed particles. The image formed (see FIGURE 11) is then an accurate reproduction of the original image 81.

In photography, an image is focussed on a light sensitive chemical film, and the film is then chemically processed to provide a record of the image. To reproduce the recorded image of the film, light is projected through a partially transparent copy of this record. Thus, this process may be set forth as optics-to chemical reaction-to optics.

With the foregoing magnetic recording and reproducing apparatus of the invention, the image is focussed on an intermediate storage medium that serves as a shutter or valve to record the image on magnetic tape. In reproducing the image, the recorded magnetic image is transferred to a similar intermediate storage medium that serves as a shutter or valve in an optical projection system. In this instance, the process may be stated as optics-to magnetics-to optics, which is in a general way analogous to the foregoing photographic process.

That the method and apparatus of the present invention, as described and illustrated, is simple and has advantages for many purposes over presently used systems is readily apparent by a brief comparison. For example, the most widely used system uses the steps of optics-to electrostatics-to electronics-to magnetics-to electronics-to optics. Thus, from six essential steps the process has been reduced to three. Also, the required equipment has been considerably reduced as between the two systems and has been simplified, as well as reduced in cost.

What is claimed is:

1. In a magnetic tape recorder, the combination comprising transparent structure containing a plurality of acicular magnetic particles having a photoemissive coating, means included in said structure for magnetically pre-orienting said particles, means disposed adjacent said structure for focussing an optical image thereon, said particles emitting electrons proportional to the intensity of illumination, means also included in said structure for establishing an electric field to re-orient said particles in accordance with the amount of charge thereon, a pre-polarized magnetic tape, means coupled to said tape for movement thereof to contact said structure, and means mounted on either side of said structure for applying a magnetic erasing field through said structure and tape to selectively erase the pre-polarization of said tape in accordance with the position of said re-oriented magnetic particles.

2. In a magnetic tape recorder, the combination comprising structure forming an evacuated chamber and having two opposing transparent sides, a plurality of acicular magnetic particles disposed within said chamber, said particles having a photoemissive coating, means included on one of said transparent sides for providing a plurality of concentrated magnetic field areas within said chamber to similarly pre-align said particles, means disposed adjacent said structure for focussing an optical image on one of said transparent sides to illuminate said particles, said particles emitting electrons proportional to the intensity of illumination, means included on both of said transparent sides for establishing an electric field therebetween to re-orient said particles in accordance with the amount of charge thereon, a pre-polarized magnetic tape, means coupled to said tape for movement thereof to contact one of said transparent sides, and means respectively mounted adjacent each of said transparent sides for applying a magnetic erasing field through said chamber and tape to selectively erase the pre-polarization of said tape in accordance with the position of said re-oriented magnetic particles.

3. In a magnetic tape recorder, the combination comprising inner and outer coaxially mounted transparent cylinders closed at the ends to provide an evacuated chamber therebetween, a plurality of acicular magnetic particles having a photoemissive coating disposed in said chamber, a plurality of conductors imbedded in said outer cylinder parallel to the axis of said cylinders, means connected to said conductors to provide a flow of current in opposite directions along adjacent conductors for orienting said particles, means mounted adjacent to said cylinders for projecting an optical image through said chamber to charge said particles by electron emission an amount depending upon the intensity of illumination, a plurality of wires mounted on the inner cylinder parallel to said conductors, means connected between said conductors and wires to render said wires positive with respect to said conductors for re-orienting said particles according to the amount of charge of said particles, a pre-polarized magnetic tape, means coupled to said tape for movement thereof in contact with said outer cylinder, and means mounted partly within said inner cylinder and partly without said outer cylinder for applying a magnetic erasing field through said chamber and tape to selectively erase the pre-polarization of said tape in accordance with the position of said re-oriented magnetic particles and magnetically record said image.

4. In a device for reproducing an image stored on magnetic tape, the combination comprising transparent structure containing a plurality of acicular magnetic particles, means included in said structure for magnetically pre-orienting said particles, means coupled to an image bearing magnetic tape for placing said tape in contact with said structure, means also included in said structure for applying high frequency magnetic fields to said particles and tape, the frequency of said magnetic fields being of a value preventing magnetic erasure of said tape, said magnetic fields combining with the image magnetism of said tape to re-orient said particles in accordance with the image magnetism, and means for projecting light through said structure and re-oriented particles to provide an optical image corresponding to the image of said magnetic tape.

5. In a device for reproducing an image stored on magnetic tape, the combination comprising structure forming an evacuated chamber and having two opposing transparent sides, a plurality of acicular magnetic particles disposed within said chamber, means included on one of said sides for providing a plurality of concentrated magnetic field areas within said chamber to similarly pre-align said particles, a magnetic tape having stored magnetic fields corresponding to an image, means coupled to said tape for placing said tape in contact with the other of said sides, means also included on said one side for applying high frequency magnetic fields to said particles and tape, the frequency of said high frequency magnetic fields being of a value preventing magnetic erasure of said tape, said high frequency magnetic fields combining with said stored magnetic fields of said tape to re-orient said particles in accordance with said stored image, and means mounted adjacent said structure for projecting light through said chamber to form an optical image corresponding to the position of said re-oriented particles.

6. In a device for reproducing an image stored on magnetic tape, the combination comprising inner and outer coaxially mounted transparent cylinders closed at the ends thereof to provide an evacuated chamber therebetween, a plurality of acicular magnetic particles disposed in said chamber, a plurality of wires mounted on said inner cylinder within said chamber parallel to the axis of the cylinders, means coupled to said cylinders to provide rotation thereof, means connected to a first selected plurality of said wires during rotation of said cylinders to provide a flow of current in opposite directions along adjacent wires for orienting said particles, a magnetic tape having magnetic fields of a stored image, means coupled to said tape for placing the tape against the outer cylinder, means connected to a second plurality of said wires during rotation of said cylinders to establish a plurality of high frequency magnetic fields with the frequency being above values causing magnetic erasure, said high frequency fields combining with the magnetic fields of said stored image to re-orient said particles in accordance with said stored image, and means mounted within said inner cylinder to project light through said chamber to form an optical image corresponding to the position of said re-oriented particles.

7. In an apparatus for forming a magnetic record of an optical image, the combination comprising means for projecting an optical image along a path, means including magnetic particles disposed along the path of the optical image for converting the optical image into a corresponding intermediate magnetic image, a magnetic medium, means for prepolarizing the medium, means for moving the prepolarized medium to a position adjacent to the intermediate image, and means for applying a magnetic erasing field through the intermediate image and medium to selectively erase the prepolarization of the medium in accordance with the intermediate magnetic image.

8. In an apparatus for forming an optical image from a magnetically stored image on a magnetic medium, the combination comprising means including magnetic particles, means for magnetically pre-orienting the physical position of the magnetic particles, means for disposing the medium adjacent to the particles, means for applying a high frequency magnetic field through the particles and medium with the frequency selected to prevent interference with the magnetic state of the particles and of the medium whereby the combination of the high frequency field and stored field of the medium physically re-orient the particles to correspond to the magnetic image of the medium, and means for projecting light through the re-oriented particles to provide an optical image.

References Cited in the file of this patent

UNITED STATES PATENTS

| | | |
|---|---|---|
| 2,294,180 | Heising | Aug. 25, 1942 |
| 2,793,135 | Sims et al. | May 21, 1957 |
| 2,918,537 | Camras | Dec. 22, 1959 |
| 2,932,278 | Sims | Apr. 12, 1960 |
| 2,970,299 | Epstein et al. | Jan. 31, 1961 |

OTHER REFERENCES

IBM Technical Disclosure Bulletin, vol. 3, No. 2, July 1960.